United States Patent [19]

van Dam et al.

[11] 4,216,419

[45] Aug. 5, 1980

[54] TACHOMETER SYSTEM

[75] Inventors: Rudolf A. A. F. van Dam; Kornelis A. Immink, both of Eindhoven, Netherlands

[73] Assignee: U.S. Philips Corporation, New York, N.Y.

[21] Appl. No.: 883,131

[22] Filed: Mar. 3, 1978

[30] Foreign Application Priority Data

Oct. 24, 1977 [NL] Netherlands ............ 7711634

[51] Int. Cl.² ............................................. H02P 5/40
[52] U.S. Cl. .................................... 318/327; 318/314; 318/318
[58] Field of Search ............... 318/327, 328, 640, 618, 318/314, 318, 326, 464; 250/570; 324/172, 175, 83 FE, 130

[56] References Cited

U.S. PATENT DOCUMENTS

| 3,648,141 | 3/1972 | Scheer | 318/314 |
|---|---|---|---|
| 3,737,751 | 6/1973 | Lima | 318/341 |
| 3,820,893 | 6/1974 | Donohue et al. | 250/570 |
| 3,836,833 | 9/1914 | Harris et al. | 318/618 |
| 3,845,370 | 10/1974 | Mantey | 318/327 |
| 4,042,863 | 8/1977 | von de Heide | 318/640 |

Primary Examiner—David Smith, Jr.
Attorney, Agent, or Firm—Thomas A. Briody; William J. Streeter; Bernard Franzblau

[57] ABSTRACT

A tachometer system for supplying a control signal indicative of positional and/or speed errors of a rotatable element comprises a tachometer on which marks are arranged in a closed track and a detector responsive thereto to produce n tacho-pulses per revolution of the tachometer. The tachometer system further comprises a memory device with n locations in which n correction signals are stored. The correction signals are obtained by driving the tachometer at an accurately constant speed, measuring the phase difference between the tacho-pulses and the reference signal, and storing the phase-error signals related to the consecutive tacho-pulses in separate locations of the memory device. When the tachometer system is used in a servo control loop these correction signals are used to correct the phase-error signals then measured, yielding a correction in respect of the deviations in these phase-error signals owing to positional tolerances of the marks on the tachometer.

12 Claims, 6 Drawing Figures

TACHOMETER SYSTEM

The invention relates to a tachometer system adapted to supply a control signal indicative of positional and/or speed errors of a rotatable element and comprising a tachometer coupled to the rotatable element, the tachometer having a plurality of marks arranged in a closed track for, in conjunction with a detector, supplying n tacho-pulses per revolution of the rotatable element, and a correction circuit for supplying n correction signals in synchronism with the tacho-pulses so as to compensate for control-signal deviations which are inter alia caused by positional errors of the marks.

Such a tachometer system is known from British Pat. No. 1,199,884, and is in particular destined for control systems with which the position and/or speed of a rotatable element is to be controlled with high accuracy. Applications of such control systems are, for example, to drive the disc head in a recording and playback apparatus for video signals provided on a magnetic record carrier in the form of a tape and to drive a disc-shaped record carrier in a recording and/or playback apparatus for this disc shaped record carrier. The record carrier may, for example, contain optically or magnetically coded video information.

In order to obtain a control signal which is indicative of the positional and/or speed errors of the rotatable element, such control systems generally use a tachometer comprising a disc or drum which is coupled to the rotatable element, equidistant marks being arranged in a closed track on said disc or drum. These marks may consist of recesses in a metal disc or magnetizations in a track of a magnetic material. This type of mark can be read with the aid of a detector, such as a magnetic head. The marks also may consist of recesses in a disc which can be detected optically.

The accuracy of the said control systems greatly depends on the tachometer, in particular on the accuracy with which this tachometer generates the control signal which is indicative of the positional and/or speed errors of the rotatable element. It has been determined that the accuracy of the tachometer is limited owing to production tolerances which arise when the marks are provided on the tacho-disc and when the tacho-disc is fixed onto the shaft which is connected to the rotatable element. Owing to these tolerances the tacho-pulse train supplied by the detector which cooperates with said marks exhibits deviations in the temporal position of the tacho-pulses, which are erroneously interpreted as positional and/or speed variations of the rotatable element by the control system and consequently result in an undesired and incorrect control behaviour.

In order to remedy this problem the aforementioned British Pat. No. 1,199,884 proposes a tachometer system in which the control signal deviations which result from inaccuracies in the tachometer are compensated for with the aid of a correction circuit. For this purpose the correction circuit includes a delay means with a variable delay time, to which the tacho-pulses supplied by the tachometer are applied. The delay time of this delay means is determined by a plurality of control signals equal to the number n of tachometer marks, i.e. equal to the number of tacho-pulses supplied per revolution of the tachometer. With the aid of a gate circuit which is controlled by the tacho-pulses it is assured that these n control signals are applied to the delay means in synchronism with the tacho-pulses, in other words that simultaneously with a specific tacho-pulse always one and the same control signal is applied to the delay means so as to define the delay time for the relevant tacho-pulse. Each of said n control signals is adjusted individually with the aid of a potentiometer. The desired adjustment for the total number of n potentiometers is obtained by driving the tachometer with an accurately constant speed and adjusting each individual potentiometer in such a way that a frequency discriminator which is connected to the output of the delay means discriminates an accurately constant frequency. This means that each tacho-pulse in the delay means is subjected to such a delay that the corrected tacho-pulse train at the output of the delay means is very accurately equidistant. By always applying the tacho-pulse train via said delay means during operation of the tachometer system and thus subjecting each tacho-pulse to an individual delay, which has been adjusted as described hereinbefore, a correction in respect of said positional deviations of the marks and of the tacho-disc is obtained.

The known tachometer system described above has the disadvantage that the correction circuit which is used is highly complex. This is mainly because of the fact that for each tacho-pulse, i.e. for each mark of the tachometer, there should be provided a separate potentiometer for adjusting the corresponding control signal. This means that when a tachometer with a large number of marks is used (accurate control systems for example require the use of tachometers with over 100 marks), the correction circuit demands the use of a high number of discrete components and consequently occupies a large volume. This also means that adjustment of the correction circuit requires a very long and accurate procedure because each potentiometer should be adjusted separately to the correct value. As a result of this the known tachometer system has a high cost price owing to the large number of components which are needed and the necessity of an intricate adjustment procedure during manufacture. Finally, when this known tachometer system is used in a servo control loop it operates correctly at one specific speed only, namely the speed for which the adjustment procedure has been carried out.

It is an object of the invention to provide a tachometer system which overcomes said drawbacks while maintaining the advantages of this known system, and which in particular can be adjusted in a considerably simpler manner.

For this the invention is characterized in that the correction circuit is provided with a memory device with n memory locations, a write system for storing n phase error signals in these n memory locations in synchronism with the tacho-pulses, which error signals are obtained by phase comparison of the tacho-pulses with a reference signal, and a read system for reading out these n phase error signals in synchronism with the tacho-pulses so as to obtain the n correction signals.

The invention is based on the recognition that in control systems employing an accurate tachometer system the control signal destined for the drive means of the rotatable element is practically always obtained by means of frequency and phase comparison of the tacho-pulse train with a reference signal, the frequency comparison serving for coarse control and the phase comparison for fine control. The invention utilizes this by not adapting the correction circuit for the correction of the temporal spacing of the tacho-pulses, as in the known tachometer system, but for the storage of correction signals which, when the tachometer system is used in a control system with a phase error detector, enable a compensation for the contribution to the phase error signal caused by the said deviations in the tachometer to be obtained by their addition to said phase error signal which is supplied by said phase error detector.

In order to obtain said correction signals it suffices to drive the tachometer with a constant speed and to apply the tacho-pulses thus obtained to a phase error detector, which also receives a reference signal which corresponds to the speed. With the aid of the write circuit the values of the output signal of this phase error detector are consecutively stored in the n memory locations of the memory device at instants corresponding to the n tacho-pulses during one revolution of the rotatable element. After one revolution each memory location therefore contains the value of the measured phase-error signal which corresponds to a specific tacho-pulse. When the tachometer system is used in a control system, these n phase error signals stored in the memory device can then be read out in synchronism with the n tacho-pulses and can be added with opposite polarity to the output signal of the phase error detector used in this control system so that the desired compensation in respect of positional errors of the marks and tacho-disc is obtained.

It will be evident that the adjustment procedure demanded by the known tachometer system may be dispensed with almost completely for the tachometer system in accordance with the invention because within a time interval corresponding to one revolution of the rotatable element the n phase error signals can be stored in the memory device fully automatically. Moreover, it will be appreciated that the correction circuit in the tachometer circuit in accordance with the invention is particularly suitable for fabrication in some form of integrated circuit technology because it requires no adjustable elements. Semiconductor memory circuits with associated write and read circuits are known and available in a multitude of versions.

If the tachometer system in accordance with the invention is to be marketed as a separate unit, the n correction signals need be stored in the memory only once. The memory device is then preferably constituted by a programmable read-only memory (PROM) because the information stored in this memory is also preserved in the absence of a supply voltage. Moreover, the information is preferably stored in digital form because it is then ensured that the information which is stored remains intact for a substantially unlimited period of time.

If the tachometer system is incorporated directly into a servo control loop, it is obvious that the same procedure as described hereinbefore may be followed for the storage of the desired correction signals. However, for specific uses it may be desirable to repeat this storage of correction signals from time to time, inter alia when the tachometer may exhibit ageing effects. It may then be more difficult to carry out the adjustment procedure for the storage of the correction signals in the memory device by making use of an external rigid drive of the rotatable element, driven at an accurately constant speed as described above. In order to solve this a servo control loop which is provided with a tachometer system in accordance with the invention and which furthermore comprises a phase detector for measuring the phase difference between these tacho-pulses and a reference signal in synchronism with the tacho-pulses and for supplying corresponding phase error signals, and a control device for driving the rotatable element in dependence on said phase error signals, is characterized in that the memory device takes the form of a random access memory and that the servo control loop is provided with first switching means for coupling the output of the phase error detector to the correction circuit for one specific measuring period only. The servo control loop also comprises second switching means for coupling, after said measuring period, the memory to a first input of an adding circuit, a second input of which is connected to the output of the phase error detector. The adding circuit is adapted to combine the signals at its two inputs with opposite polarity and to render this combined signal available at its output as a control signal for the control device. The correction device comprises means for at least approximately determining the average value over the measuring period of each of the phase error signals related to a specific tacho-pulse. Finally, the servo control loop is provided with means for limiting the bandwidth of the transfer function of said control loop during the measuring period to a frequency which is lower than that which corresponds to the speed of the rotatable element.

The invention will be described in more detail with reference to the accompanying drawing in which.

Figure 1:
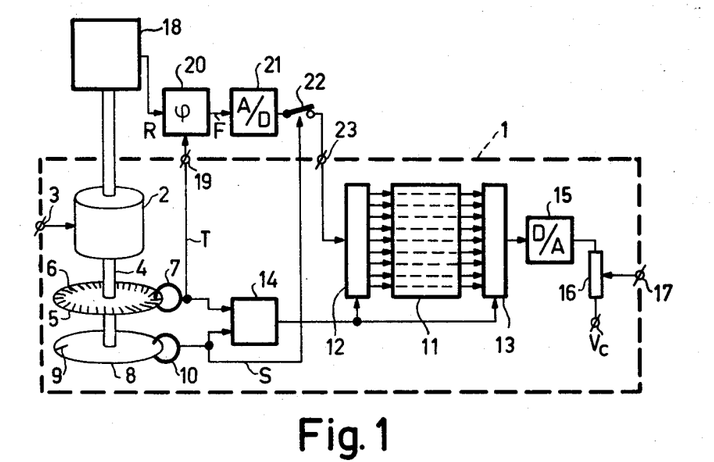
FIG. 1 shows an embodiment of the tachometer system in accordance with the invention and the switching method for the storage of the correction signals.

The tachometer system in accordance with the invention is shown within block 1 in FIG. 1. This figure further illustrates the switching method for obtaining the correction signals and storing them in the memory device.

The tachometer system 1 in the present embodiment comprises a motor 2 as the rotatable element. The motor normally receives a control signal for controlling its speed via a control terminal 3. A tachometer disc 5 is coupled to the motor shaft 4, on which disc n equidistantly spaced marks 6, for example n recesses, are situated. The desired tacho-pulse train is obtained with the aid of a pick-up element 7 which cooperates with said tachometer disc 5. A second disc 8 is also coupled to the motor shaft 4, which second disc has only one mark 9 and cooperates with a pick-up element 10. The motor 2 need not necessarily form a part of the tachometer system 1. In the present embodiment this motor 2 has only been included in block 1 because this is the most effective design, i.e. the motor, tachometer and correction circuit together constituting one unit.

The tachometer system 1 further comprises a memory device 11 with n memory locations for the n correction signals, a write circuit 12 for writing these n correction signals into said n memory locations and a read circuit 13 for reading out these n correction signals. The write circuit 12 and the read circuit 13 both receive a control signal from a control circuit 14 which has two inputs which are connected to the pick-up elements 7 and 10.

In the present embodiment it has been assumed that the n correction signals are stored in the memory device in digital form. In order to reconvert these signals into analog signal values during reading, the tachometer system 1 includes a digital-analog converter 15 which is coupled to the read circuit 13. The output of this converter is connected to a variable voltage divider 16 having a tapping connected to an output terminal 17.

In order to store the desired correction signals to in the stored memory device 11, it is first of all necessary that the motor 2 together with the tachometer discs 5 and 8 rotate at an accurately constant speed. For this purpose, it is possible to drive the motor shaft 4 at an accurately constant speed with the aid of an external drive means, represented by the block 18. The train of tacho-pulses supplied by the pick-up element 7 is then applied to a phase error detector 20 via a terminal 19, which detector receives a reference signal R as a reference. The output signal of said phase error detector 20 is digitized with the aid of an analog-to-digital converter 21, after which the digitized signal is applied to the write circuit 12 via a switch 22 and a terminal 23.

Figure 3:
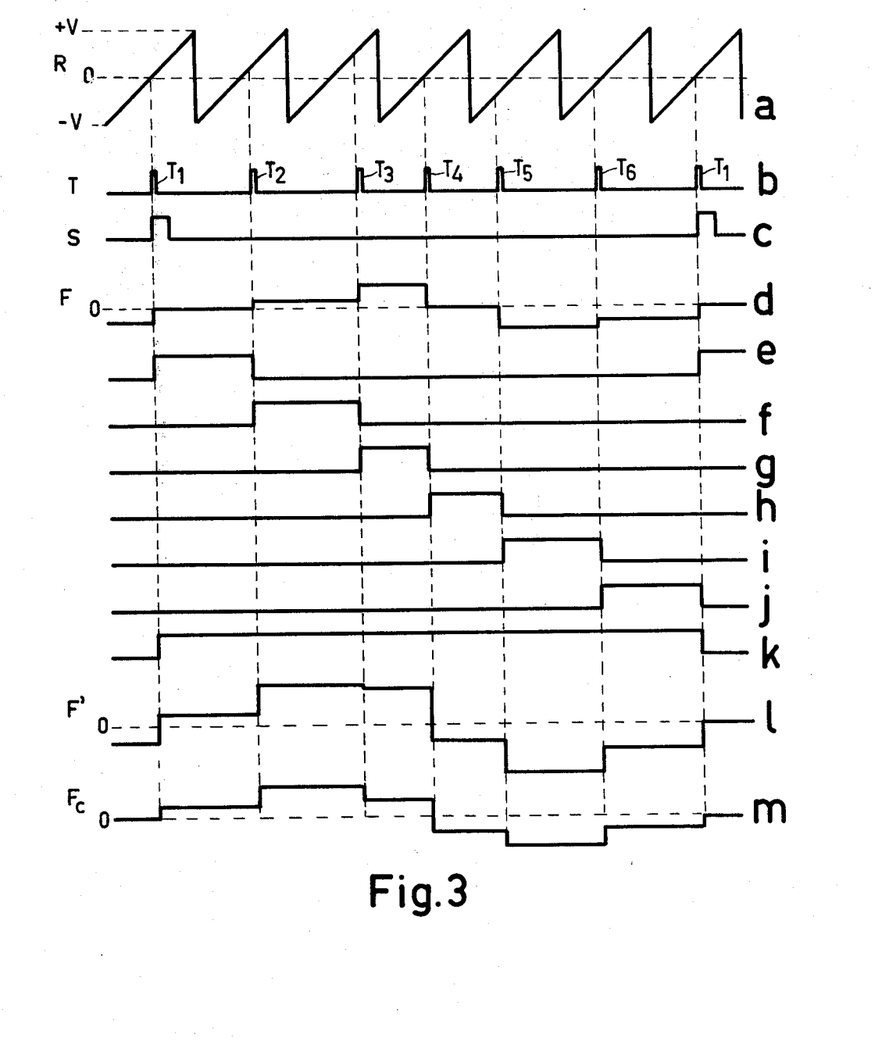
FIG. 3 shows the signal waveforms appearing in the system in accordance with FIGS. 1 and 2.

To explain the operation of the present device when the n correction signals are written into the memory device 11, reference is made to the signal wave forms shown in FIG. 3. FIG. 3a shows the reference signal R as a sawtooth-shaped signal of fixed frequency and a signal value ranging from a voltage $-V$ to a voltage $+V$. For the sake of simplicity, it is assumed that the tachometer disc 5 has only 6 marks so that the tachometer pulse train T shown in FIG. 3b supplies 6 tachometer pulses $T_1$ through $T_6$ per revolution. FIG. 3c shows the pulse S supplied by the pick-up element 10, for which it has been assumed that this pulse coincides with the tachometer pulse $T_1$. It will be evident that the tachometer pulse shapes have been idealized, but the shape of these tachometer pulses is not essential to the operation of the device. The particular shape of the reference signal R shown also is not essential, but depends on the type of phase error detector which is used. Obviously, the tachometer pulse train may also be converted into a sawtooth-shaped signal which is sampled at instants which are determined by the reference signal. Furthermore, it will be evident that the additional tacho-disc 8 may be dispensed with if one of the marks 6 of the disc 5 is given a recognizably different shape.

It is assumed that in the present embodiment a phase error detector is used consisting of a sample and hold circuit, i.e. a detector which determines the signal value of the sawtooth-shaped reference signal R at instants determined by the tachometer pulses T and which holds this signal value until the next sampling instant. As the reference signal R, in particular its frequency, has been selected to be in conformity with the speed defined by the external drive means 18, the repetition frequency of the tacho-pulse train T is equal to the frequency of said reference signal R. This would mean that if, as is shown, the first tacho-pulse T1 appears exactly halfway along an edge of the reference signal R, the subsequent tachopulses $T_2$ through $T_6$ would also appear halfway along consecutive edges of said reference signal, so that the output signal of the phase error detector 20 would then always be zero. In order to ensure that the reference signal R and the tachopulse train have the said phase relationship, the drive means 18 may simply be corrected, if desired, automatically. However, if the marks 6 on the tachometer disc 5 are not spaced at exactly equal distances from each other or if the centre of rotation of the tacho-disc 5 exhibits an eccentricity, this will result in the tachopulses being shifted in time relative to each other, which is shown exaggerated in FIG. 3b in that the tachometer pulses $T_2$ and $T_3$ appear too late and the tachometer pulses $T_5$ and $T_6$ appear prematurely. As a result of this shift of the tacho-pulses, the output signal F of the phase error detector will not be zero, but will be as shown in FIG. 3d.

In accordance with the invention the variation of this phase error signal is stored in the memory device 11 for the duration of one revolution of the tachometer. In order to accomplish this a control signal for the switch 22 is first of all produced with the aid of the pulse S (FIG. 3c) supplied by the pick-up element 10, which control signal is shown in FIG. 3k. This control signal, which can be obtained in a simple manner with the aid of a flip-flop which is triggered by the pulse S, or with the aid of a counter which counts the tacho-pulses, ensures that the switch 22 is closed for exactly one revolution of the tachometer so that during this one revolution the phase error signal F is applied to the write circuit 12.

This write circuit 12 then receives a control signal from the control circuit 14, namely in such a way that each phase-error signal measured after a specific tachopulse $T_1$ through $T_6$ is consecutively applied to a separate memory location of the memory device 11. The shape of these control signals obviously depends on the design of the write circuit 12. In FIGS. 3e through 3j six squarewave control signals are shown which consecutively occupy the time interval between consecutive tacho-pulses. These squarewave control signals can be obtained with the aid of a ring counter included in the control circuit 14, which counter is set to its initial count by the pulse S and is advanced one position by each subsequent tacho-pulse T. The control signals shown in FIGS. 3e through 3j then appear at the outputs coupled to the first 6 bits of said ring counter. By including six gate circuits in the write circuit 12, which circuits have one common input which is connected to the terminal 23 and each have an individual input which receives one of the six control signals, the outputs of said gate circuits being coupled to individual memory locations of the memory device, it is achieved that the digitized values of the phase error signal between every two consecutive tacho-pulses T are applied to a separate memory location of the memory device 11. This method of producing the control signals in principle corresponds to that disclosed in the said British Pat. No. 1,199,884 with respect to the consecutive activation of the adjusting potentiometers for the variable delay means. However, other forms of the control circuit 14 in conjunction with the write circuit 12 will be obvious to those skilled in the art.

If the tachometer system 1 is to be marketed as a separate unit, a programmable read-only memory (PROM) is preferably used as the memory device 11. This has the advantage that once the phase error signals have been written into this memory device during manufacture, this information remains fully preserved without the necessity of this memory device being connected to a supply voltage.

Figure 2:
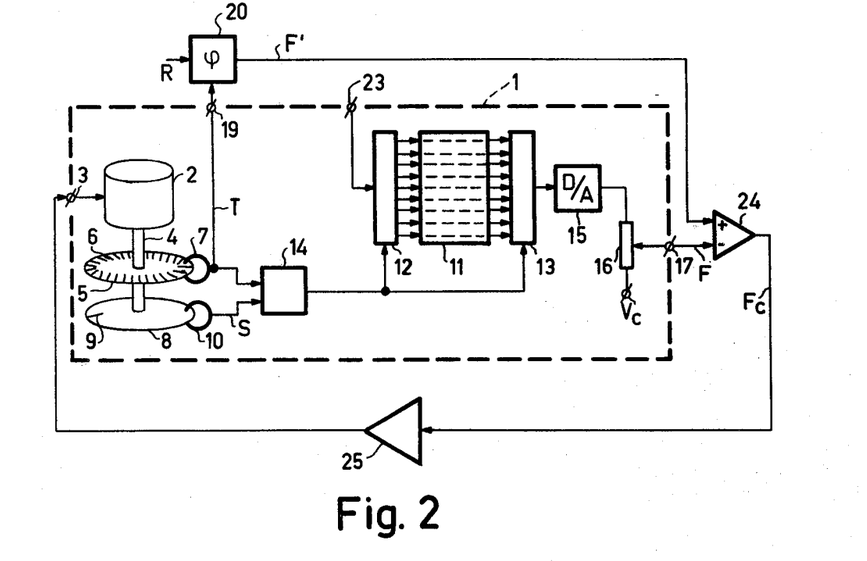
FIG. 2 shows the tachometer system in accordance with the invention and the switching method for use in a servo control loop.

FIG. 2 illustrates the switching method of the tachometer system in accordance with the invention used in a servo control loop. Corresponding elements in this Figure bear the same reference numerals as in FIG. 1. The tachometer system 1 is identical to that of FIG. 1, with the proviso that it is now assumed that the correction signals are stored in the memory device 11 in accordance with the method described with reference to FIG. 1.

The tacho-pulses T supplied by the pick-up element 7 are applied to a phase error detector 20 via terminal 19, which detector also receives the reference signal R. The output of this phase error detector 20 is coupled to an input (+) of a differential amplifier 24, whose other input (−) is coupled to the output terminal 17 of the tachometer system 1. This differential amplifier 24 serves to subtract the correction signals, which are supplied via the output terminal 17, from the phase error signals supplied by the phase detector 20 and may thus also be constituted by a simple resistor network. The output signal of the differential amplifier 24 serves as a control signal for the motor 2 and for this purpose it is applied to the terminal 3 via a servo amplifier 25. It will be evident that the control method is irrelevant in order to follow the principle of the invention. Obviously, it is possible to control the energization of the motor 2, but it is equally possible to control the energization of an eddy current brake which is mounted on the motor shaft 4.

The operation of the device shown in FIG. 2 will be explained with reference to FIG. 3. It has been assumed that the phase error detector 20 is of the same type as that of FIG. 1 and that it supplies an output signal F' as shown in FIG. 3l. This output signal F' represents phase errors of the detected tacho-pulse train, which are partly caused by deviations in the speed of the motor 2 and partly by positional errors of the marks 6 on the tachometer disc 5 or of the disc itself. Using said signal F' for controlling the motor 2 would consequently result in erroneous control because the contribution of the positional errors of the marks of the tachometer disc 5 would erroneously be interpreted as speed errors by the control system. It is to be noted that for the sake of simplicity the position of the tacho-pulses T as shown in FIG. 2b is adhered to. In reality these tacho-pulses are shifted owing to speed variations which are related to the phase error signal F'.

With the aid of the tachometer system in accordance with the invention errors are prevented because the n phase error signals stored in the memory device 11 are subtracted from said output signal F' of the phase error detector 20 in synchronism with the tacho-pulses T. For this purpose, the read circuit 13 is coupled to the n memory locations, which read circuit 13 is controlled by the control circuit 14 in a similar way to that of the write circuit 12. As a result of this, the n digitized phase-error signals stored in the memory device are consecutively read out in synchronism with the tacho-pulses T. These n digitized phase-error signals are subsequently converted into analog signal values with the aid of the digital-to-analog converter 15, which results in n correction signals at the output terminal 17, which in the present example together correspond to the signal F in accordance with FIG. 3d. This signal F is subtracted from the output signal F' of the phase error detector 20 with the aid of the differential amplifier 24, yielding the control signal $F_c$. This control signal $F_c$ consequently represents only deviations of the speed of the motor 2, in other words the influence of an incorrect positioning of the marks on the tachometer disc 5 and of the disc itself is compensated for completely.

The voltage divider 16 included between the digital-to-analog converter 15 and the output terminal 17 serves to obtain an adaptation of the correction to the type of phase-error detector used in the servo control loop. If the phase error detector 20 used in the servo control loop is not identical to the phase error detector used for writing phase-error signals into the memory device 11 in accordance with the method described with reference to FIG. 1, an adaptation of the correction signals which are read from the memory device 11 will be necessary. This can be effected simply by changing the voltage division realized by the voltage divider 16 and/or an adaptation of the bias voltage $V_c$ to this voltage divider 16.

However the speed with which the motor 2 is driven, has no influence at all on the correction effected by the tachometer system described. The method of storing the n correction signals in the memory device 11 as described with reference to FIG. 1 may then be carried out at an arbitrary speed of the motor 2, after which the tachometer system is suitable for use in a control loop for driving the motor 2 at any other arbitrary speed without any modifications.

The tachometer system described hereinbefore is first of all intended to be non-recurrently factory-adjusted, i.e. the correction signals are non-recurrently stored in the memory device during manufacture. In certain control systems it may be desirable to perform this adjusting procedure after the tachometer system has been incorporated in the control system and it may even be desirable to repeat this adjusting procedure from time to time. This may be desirable when a tachometer system is used which does not include the motor but which is coupled to a separate motor, which may give rise to an unpredictable eccentricity as a result of this coupling, which as previously stated, also gives rise to deviations in the temporal spacing of the tachometer pulses.

Figure 4:
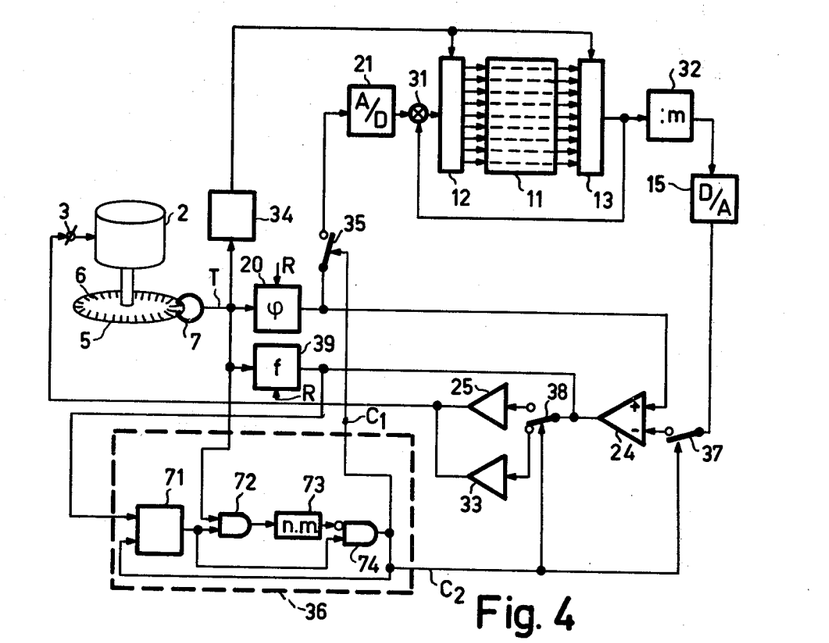
FIG. 4 shows an embodiment of a tachometer system in accordance with the invention used in a servo control loop.

FIG. 4 shows a tachometer system in accordance with the invention, used in a servo control loop, with steps being taken to carry out the aforementioned adjusting procedure but without the tachometer having to be driven at an accurately constant speed via an external drive means. The device shown in this Figure is in particular intended for those cases in which the said adjustment procedure is to be repeated each time that the servo control loop is put into operation. Corresponding elements in this Figure again bear the same reference numerals as in FIGS. 1 and 2.

In this case only one disc 5 with n marks 6, which are detected with the aid of the pick-up element 7, is coupled to the motor 2. The detected tachometer pulse train T is applied to the phase error detector 20 for comparison with a reference signal R. The output of this phase error detector 20 is coupled to the A/D converter 21 via a switch 35. The design of this A/D converter 21, the write circuit 12, the memory device 11, the read circuit 13, and the D/A converter 15 may be identical to that of the corresponding elements in the devices in accordance with FIGS. 1 and 2, with the proviso that the memory device 11 is now of the random access type (RAM), i.e. a memory which always permits the storage of new information.

The output of the phase detector 20 is again connected to an input (+) of a differential amplifier 24, whose other input (−) is connected to the output of the D/A converter 15 via a switch 37. The output of this differential amplifier 24 is connected to the master contact of a switch 38, whose two outputs are respectively connected to the servo-amplifiers 25 and 33 having outputs jointly connected to the control terminal 3 of the motor 2.

When the servo-control loop is put into operation, the motor 2, as usual, is first of all driven with a maximum control signal in order to bring this motor to approximately the desired speed. For this purpose the phase detector 20 is generally combined with a frequency detector. This combination then assures that as long as the repetition frequency of the tachometer pulse train T has not yet reached the desired value, the motor receives a maximum control signal, whereas from the instant that this desired frequency is reached the phase detector provides a fine control of the speed. For an example of such a combined frequency and phase error detector reference is made to U.S. Pat. No. 3,821,604. However, for the purpose of illustration the Figure shows a separate frequency detector 39 to which the tacho-pulse train T is applied and which, as long as the desired speed has not yet been reached, supplies a maximum control signal to the servo amplifier via the switch 38 which is then in the upper position. However, when the desired speed is reached, the output signal of this frequency detector 39 is zero and the speed is further controlled by the phase error detector 20.

When the speed of the motor 2 has reached the correct value, i.e. if the frequency of the tacho-pulse train T has the correct value, the adjustment procedure may be started. For this purpose the switches 35, 37 and 38 are set to the positions shown in the Figure by means of switching signals $C_1$, $C_2$ supplied by the switching circuit 36.

As is evident from the Figure, the servo amplifier 33, instead of the servo amplifier 25, is then included in the closed servo loop during the adjustment procedure. This servo amplifier 33 has a lower gain than the servo amplifier 25, which gain is such that the bandwidth of the control loop is then so small that signals of frequencies equal to or higher than those corresponding to the speed of the motor 2 cannot affect the control. This means that those variations of the output signal of the phase error detector 20, which eventually provides the control signal for the motor 2 via the differential amplifier 24 and the servo amplifier 33, which have a frequency equal to or higher than the frequency corresponding to the speed have no influence on the control of the motor 2.

This is necessary in order to enable the desired correction signals to be stored in the memory device 11. Since in this case the motor 2 is not driven in a rigid manner, i.e. with an accurately constant speed, it no longer suffices to store the phase error signals which appear within a time interval of one revolution because these phase error signals contain an arbitrary contribution caused by variations of the motor speed and are therefore no longer representative of the deviations of the tachometer. In accordance with the invention this problem is solved by averaging each of the phase error signals corresponding to a specific tacho-pulse over a number of revolutions of the motor so that the contribution as a result of speed variations, which is arbitrary from revolution to revolution, is averaged. However, in this respect it is important that the variations of the phase error signal caused by positional errors of the marks on the tachometer are not eliminated by the control loop, which is achieved by limiting the bandwidth of this control loop to the specified value. Instead of including a separate amplifier 33, it is of course also possible to include a low-pass filter in the control loop during the adjustment procedure.

In the present embodiment this averaging of the phase error signals is obtained by applying the measured phase error signals at the output of the phase error detector 20 to the analog-to-digital converter 21 via the switch 35 which is closed during the adjustment procedure, after which the digitized signal values are applied to an adding device 31. Simultaneously with each phase error signal thus obtained, which is related to a specific tacho-pulse, this adding device 31 receives the signal content of the memory location of the memory device 11, which location is related to the same tacho-pulse, via the read circuit 13. These two signals are added and again written into the same memory location via the write circuit 12. This means that for example after m revolutions of the tachometer 5 the signal content of each memory location of the memory device 11 corresponds to the sum of the phase error signal relates to a specific tacho-pulse over these m revolutions. In order to determine the average value of the corresponding phase error signal for every tacho-pulse over the duration of these m revolutions, it suffices to divide this sum signal by a factor m with the aid of a dividing stage 32.

The manner in which this division is effected, inter alia depends on the magnitude of m and, in conjunction therewith, the desired accuracy. If m can be selected comparatively small, for example m=15, this division may also be effected with the aid of the signal value which has been reconverted into an analog signal. This means that a 1:25 voltage divider is then included behind the digital-to-analog converter 15. However, if in view of the desired accuracy m is selected high, for example m=100, this division is preferably performed in a digital manner. A simple dividing method can be obtained by selecting m to equal a power of 2, for example $2^8=256$. In this case division is possible by eliminating the last eight least significant bits of the binary code read from the memory device 11, which represents the signal value, and by transferring the remaining bits as dividend to the digital-to-analog converter 15. In this case this division may also be built into the memory device 11. For this purpose it suffices to split each memory location into two registers, namely a first register in which said eight least significant bits are stored and a second register in which the remaining bits are stored. The desired dividend is then obtained during operation of the servo control loop, i.e. after termination of the adjustment procedure, by reading only the second register of each location.

The switching signals for the switches 35, 37 and 38 are obtained with the aid of the switching circuit 36. This switching circuit 36 comprises a bistable multivibrator 71 which is triggered by the falling edge of the output signal of the frequency detector 39, i.e. at the instant that frequency equality of the tacho-pulse train T and the reference siganl R is detected. The output of said bistable MV is connected to an AND gate 72 and an AND gate 74. The AND gate also receives the tacho-pulse train T and its output is connected to a counter 73, which counts the applied tacho-pulses and supplies a logic "1" at it output as soon as the count n.m. is reached, i.e. after m revolutions of the tachometer reckoned from the beginning of the adjustment procedure. The output of this counter 73 is connected to an inverting input of the AND-gate 74. This means that as long as the counter 73 has not yet reached said count n.m., the output signal of the AND-gate 74 causes the switches 35, 37 and 38 to assume the positions shown. However, as soon as said count is reached all three switches are changed over so that from that instant on the amplifier 25 is operative in the control loop and the control loop has the full bandwidth, the correction signals stored in the memory device 11 are applied to the differential amplifier 24, and the connection between the phase-error detector 20 and the A/D converter 21 is interrupted. Moreover, the bistable MV 71 is reset at this instant.

Figure 5:
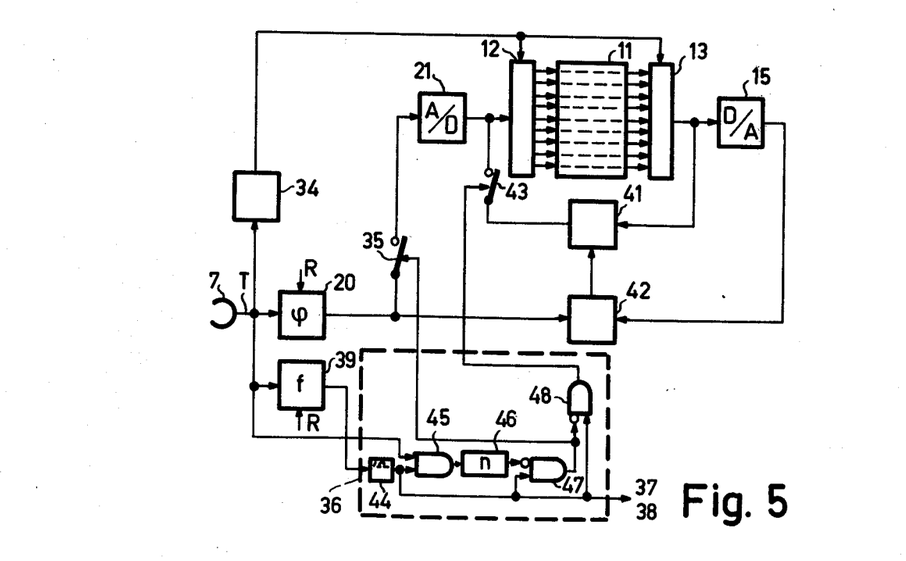
FIG. 5 shows an alternative embodiment of said system.

FIG. 5 shows an alternative method of obtaining the average value of the phase error signals over a sufficiently long time interval, which need not necessarily equal a whole number of revolutions of the tachometer. For the sake of simplicity said Figure only shows the elements which are of importance for this averaging operation, it being assumed that coupling to the control loop is effected in the same manner as shown in FIG. 4.

The adjustment procedure is again initiated by the frequency detector 39, i.e. it commences when frequency equality of the tachopulse train T and the reference signal R is detected. The switches 35 and 43 then assume the positions shown. This means that the measured phase error signals from the phase error detector 20 are stored in the memory device 11 via the switch 35, the A/D converter 21 and the write circuit 12. After exactly one revolution of the tachometer, i.e. at the instant that n phase error signals are stored in the memory device 11, switch 35 is opened and switch 43 is closed. From this instant on the phase error signal, which is related to a specific tacho-pulse, is each time compared in a comparator 42 with the contents of the memory device 11 which is related to the same tacho-pulse. Depending on which of these two signals has the greater value, the comparator 42 supplies a positive or a negative control signal to an arithmetic unit 41.

In synchronism with the comparator 42 the arithmetic unit 41 receives the phase error signals stored in the memory 11 in digital form. The arithmetic unit is adapted to add or subtract a fixed value to or from the digital signal applied to its input depending on the polarity of the control signal supplied by the comparator 42. One unit of the least significant bit of the digital signal may for example serve as said fixed value. The digital signal value thus corrected is directly written into the memory device 11 via the closed switch 43. One revolution later this value of the stored phase error signal is again compared with the phase error signal which is then detected, resulting in a second correction of the signal value which is stored in the memory device 11, etc. The last value of the correction signal in the memory device 11 obtained after a sufficiently large number of revolutions of the tachometer disc 5, which value is related to a specific tachometer pulse, then corresponds to the average value of this phase error signal over said period with reasonable accuracy.

After this period the memory device 11 consequently contains n correction signals which each individually represent the average value of the phase error signals over said period and which are related to a specific tacho-pulse. At the end of this period the switch 43 is opened so that no further correction of the correction signals stored in the memory device 11 is effected. Furthermore, the switch 37 (see FIG. 4) is closed at this instant so that the correction signals stored in the memory device 11 are supplied to the differential amplifier 24 for correction of the phase-error signals supplied by the phase error detector 20. Finally, the switch 38 (see FIG. 4) is set to the upper position at this instant so that the servo amplifier 25 becomes operative in the closed control loop, as a result of which the control loop operates over the full bandwidth from this instant.

The required switching signals for the switches 35, 37, 38 and 43 can again be realized in a simple manner with the aid of logic circuits. As an example, the switching circuit 36 may comprise a monostable multivibrator 44 which is triggered by the falling edge of the output signal of the frequency detector 39 and which thus determines the time interval for the adjusting procedure. The output signal of this monostable MV may be used directly as the switching signal for the switches 37 and 38. In order to obtain the switching signals for the switches 35 and 43 the output signal of the monostable 44 is applied to the AND-gate 45 together with the tacho-pulse train T. The output of this AND gate is connected to a n-counter 46, i.e. a counter which produces a logic "1" at its output as soon as n pulses have been applied to its output. The output of this counter 46 is connected to an inverting input of an AND-gate 47, whose other input receives the output signal of the multivibrator 44. This results in a switching signal at the output of said AND-gate 47 which ensures that the switch 35 is closed only during a time interval corresponding to one revolution of the tachometer disc 5 after the beginning of the adjustment procedure. The switching signal required for the switch 43 is obtained with the aid of an AND gate 48, which receives the output signal of the multivibrator 44 at one input and the output signal of the AND-gate 47 at an inverting input.

It will be evident that the use of a tachometer system in accordance with the invention in a control loop is by no means limited to the examples shown in FIGS. 4 and 5. This applies both in respect of the location of the switches for establishing the switching procedure and in respect of the manner in which said adjusting procedure is carried out, in particular the manner in which the phase error signals are averaged. Thus, while maintaining the method of averaging in accordance with FIG. 5, it is alternatively possible to carry out averaging by means of analog signal values. For this purpose the comparator 42 may be replaced by a differential amplifier which applies a fraction of the difference signal to a summing device, which replaces the arithmetic unit 41 and which also receives the output signal of the D/A converter 15. Subsequently, the summed signal should be applied to the A/D converter 21 via the switch 43.

It is alternatively possible to dispense with the coupling between the phase error detector 20 and the A/D converter 21 via the switch 35. Also in this case only a fraction of the phase error signals then detected is written into the memory device during the first revolution of the tachometer disc 5 after the start of the adjustment procedure. This means that the value of each of the signals stored in the memory device 11 approximates asymptotically to the average value. If the adjustment procedure is selected to be sufficiently long, this will hardly effect the ultimate result. Moreover, if desired, the fraction of the difference signal which is added to the signal already stored may be varied during the adjustment procedure, i.e. commence by adding a comparatively large portion of the difference signal to the stored signal and have this fraction decrease gradually or step-wise.

Furthermore, it is to be noted that in the devices in accordance with FIGS. 4 and 5 no additional tachometer disc 8 in accordance with FIGS. 1 and 2 is necessary because in the devices of FIGS. 4 and 5 it has been assumed that the adjustment procedure is performed each time that the servo control loop is put into operation so that a full synchronization with respect to the tachometer pulse train is ensured. The control device 34 then receives only the tachopulse train T. If said adjustment procedure is not to be repeated each time, for which purpose for example the memory device can be operated via a separate power supply independently of the rest of the device in order to preserve the information which is stored even when the servo control loop is not in operation, such an additional reference is still necessary. For this purpose an additional tacho-disc may be used or, of course, one of the marks of the disc 5 may have a different shape or property yielding an additional control signal which consists of one pulse per revolution, corresponding to the signal S in FIG. 3c.

Futhermore it is to be noted that the phase error signals may be stored in analog form in a memory device. The A/D and D/A converters 21 and 15 respectively may then be dispensed with. The disadvantage of a memory device for analog signals is generally that the information which is stored is subject to losses during read-out of the signal values. A remedy for this is provided by known circuits which at regular intervals, in particular during reading, restore the original level of the signal samples.

Finally it is to be noted that the method of determining the average value of the phase error signals over a specific period described with reference to FIGS. 4 and 5 may also be used for a factory adjustment procedure. Instead of the adjustment procedure described with reference to FIG. 1, the average value of the phase error signals over a specific time is determined first and these average values are stored in the memory device. The disadvantage that the adjustment procedure takes more time is compensated for by the advantage that less stringent requirements are imposed on the constancy of the speed with which the tachometer is driven.

Finally, it will be appreciated that the invention is by no means limited to the embodiment shown in the Figures. Alternative embodiments in respect of inter alia the switching circuit 36, the means for determining the average values of the phase error signals and the memory device with associated write and read circuits will be obvious to those skilled in the art.

Averaging the phase error signals during the measuring period in an alternative manner is possible in particular because the system which is shown is eminently suitable for use in conjunction with a programmable processor. This processor may then be employed both for determining the measuring period and for averaging the phase signals over this measuring period.

Figure 6:
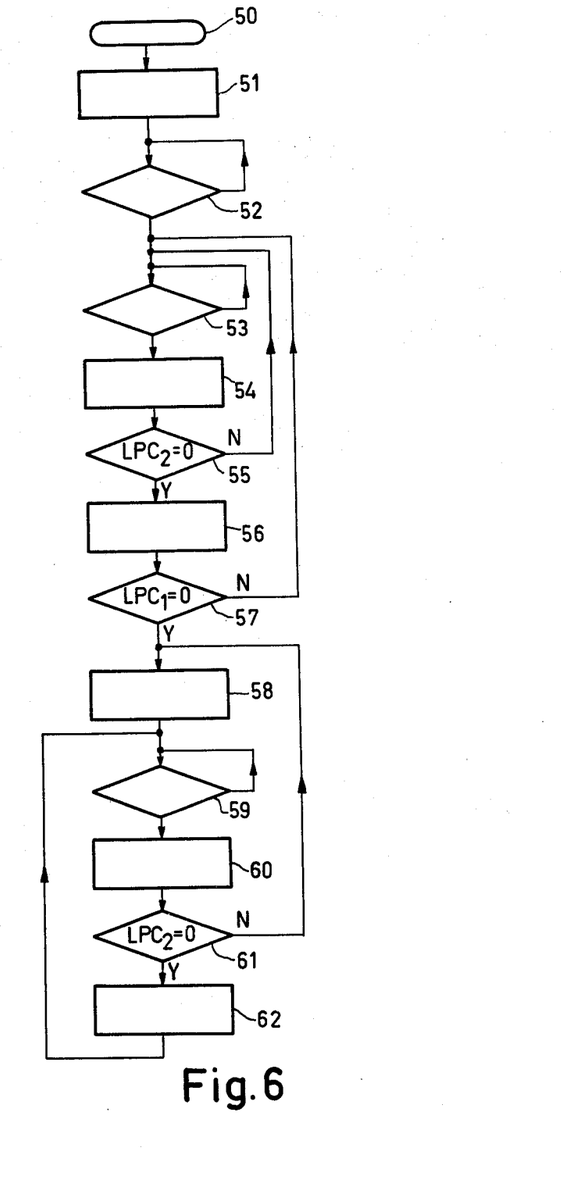
FIG. 6 shows a flow chart to explain the use of a programmable digital signal processor in the system in accordance with the invention.

In an experimental arrangement use has been made of a Signetics 2650 microprocessor. In order to explain the operation of a system employing a processor, FIG. 6 shows the flow chart relating to this microprocessor.

The programme cycle is started by block 50. Subsequently, the "0" information is first of all written in all addresses in accordance with block 51. Moreover, a control signal is supplied to switch 38 (FIG. 4), in such a way that this switch assumes the position shown, so that the servo-loop is operative with a limited bandwidth (Flag:=1). Finally, the number m is written into a first register [$LPC_1=m$], m corresponding to the number of revolutions of the tachometer disc during the desired measuring period, and the number n[$LPC_2:=n$] is written into a second register, n being the number of marks on the tachometer disc.

In accordance with block 52 the motor is brought to the desired speed, i.e. the programme cycle is not continued until the motor has reached the desired speed. When this is the case synchronisation with the tachometer pulses is effected in accordance with block 53, i.e. the programme cycle proceeds to block 54 upon the appearance of a tachometer pulse.

In accordance with this block 54 the phase error signal is sampled [SAM]upon the appearance of a tachometer pulse, this sampling value is added to the contents of the memory location assigned to the relevant tachometer pulse, and the sum value is again written into this memory location [SUM ($LPC_2$):=SUM ($LPC_2$)+SAM]. Moreover, the contents of the second register is reduced by "1"[$LPC_2:=LPC_2-1$].

Subsequently, in accordance with block 55 the contents of the second register is checked. If the contents is not equal to "0", the programme cycle proceeds to block 53 and the operation in accordance with block 54 is carried out upon the appearance of the next tachometer pulse. If the contents of the second register is equal to "0", the programme cycle proceeds to block 56. In accordance with block 56 the contents of the first register is reduced by "1"[$LPC_1:=LPC_1-1$] and the contents of the second register again becomes n[$LPC_2:=n$].

In accordance with block 57 the contents of the first register is then checked. If this is unequal to "0", the programme cycle proceeds to block 53. If the contents is equal to "0", the measuring period has finished and the programme cycle proceeds to block 58. In accordance with block 58 a control signal is supplied to the switch 38 (FIG. 4) in such a way that this switch assumes the upper position and the servo-loop consequently operates with a large bandwidth (FLAG:=0). Moreover, in accordance with block 58 the contents of the memory location assigned to the instantaneously appearing tachometer pulse is read and divided by m[SUM($LPC_2$):=SUM($LPC_2$/m].

Subsequently, in accordance with block 59 synchronisation in respect of the tachometer pulses is effected again. Upon the appearance of a tachometer pulse the programme cycle proceeds to block 60. In accordance with block 60 the value computed in accordance with block 58 is supplied to the output as a correction signal [OUTPUT SUM ($LPC_2$)]. In accordance with block 60 the contents of the second register is furthermore reduced by "1" [$LPC_2:=LPC_2-1$].

Subsequently, in accordance with block 61 the contents of this second register is checked. If the contents is unequal to "0", the programme cycle proceeds to block 58, and if the contents is "0", the programme cycle proceeds to block 62. In accordance with block 62 the contents of the second register is made equal to n[$LPC_2:=n$] and the programme cycle proceeds to block 59 again.

What is claimed is:

1. A tachometer system for supplying a control signal indicative of positional and/or speed errors of a rotatable element comprising, a tachometer coupled to the rotatable element, the tachometer having a plurality of marks arranged in a closed track, a detector responsive to said marks for supplying n tacho-pulses per revolution of the rotatable element, and a correction circuit for supplying n correction signals in synchronism with the tacho-pulses so as to compensate for control-signal deviations caused by positional errors of the marks, the correction circuit comprising, a memory device with n memory locations, a write system for storing n phase error signals in said n memory locations in synchronism with the tacho-pulses, the phase error signals being obtained by phase comparison of the tacho-pulses with a reference signal while the tachometer is driven at approximately a constant speed, and a read system for reading said n phase error signals from the memory device in synchronism with the tacho-pulses so as to obtain the n correction signals.

2. A tachometer system as claimed in claim 1, wherein the memory device comprises a programmable read-only memory.

3. A servo control loop comprising a tachometer system as claimed in claim 1, a source of reference signal, a phase error detector for measuring the phase difference between said tacho-pulses and the reference signal in synchronism with the tacho-pulses and for supplying corresponding phase error signals, a control device for driving the rotatable element in response to an input signal to the control device, and an adding device for adding together with opposite polarity the phase error signals supplied by the phase error detector and the correction signals supplied by the memory device and supplying the sum signal to an input of the control device as a control signal.

4. A servo control loop comprising a tachometer system as claimed in claim 1, a source of reference signal, a phase error detector for measuring the phase difference between the tachopulses and the reference signal in sychronism with the tacho-pulses and for supplying corresponding phase-error signals, a control device for driving the rotatable element in response to a control signal, the memory device comprising a random- access memory, the servo control loop including a first switching means for coupling the output of the phase error detector to the correction circuit during one specific measuring period only, second switching means for coupling, after said measuring period, the memory device to a first input of an adding circuit, means connecting a second input of the adding circuit to the output of the phase detector, the adding circuit being operative to combine the signals at its two inputs with opposite polarity and to supply the combined signal at its output as a control signal to the control device, the correction circuit comprising means for at least approximately determining the average value over the measuring period of each of the phase error signals related to a specific tacho-pulse, and the servo control loop includes means for limiting the bandwidth of the transfer function of said control loop during the measuring period to a frequency which is lower than that which corresponds to the speed of the rotatable element.

5. A servo control loop as claimed in claim 4 wherein the system for determining the average value of the phase error signals includes a programmable digital signal processor.

6. A control system for a rotatable element comprising, a tachometer coupled to the rotatable element and including a plurality of n marks arranged in a closed track for deriving n pulse signals per revolution of the rotatable element, a reference frequency source providing a reference signal indicative of a desired rotation of the rotatable element, comparision means connected to compare the output of the reference frequency source with the output of the tachometer in sychronism with said pulse signals to produce at its output corresponding phase error signals, or addressable memory device having n unique memory locations corresponding individually with the n marks in the closed track of said tachometer, means for storing n phase error signals in said n memory locations in sychronism with the tachometer pulse signals by means of an open-loop method of initially comparing the tachometer pulse signals with said reference signals with the tachometer driven at approximately constant speed so as to yield said n phase error signals which are independent of the speed of the rotatable element, a read system sychronized with the tachometer for reading out said n phase error signals stored in the memory device in sychronism with the tachometer pulse signals to derive n correction signals corresponding to said n marks, means for subtractively combining the phase error signals supplied by the comparison means with the correction signals supplied by the memory device to produce a control signal, and a control device responsive to said control signal for driving the rotatable element.

7. A control system as claimed in claim 6 further comprising address selection means for sequentially addressing said n memory locations in sychronism with the tachometer pulse signals, and wherein the control device includes a motor coupled to drive the rotatable element and the phase error signals stored in the memory device are independent of the acceleration characteristic of the motor.

8. An error compensation system for an apparatus that controls a rotatable element comprising, a tachometer adapted to be coupled to the rotatable element and including a plurality of indicia arranged in a closed track for deriving n pulse signals per revolution of the rotatable element, a memory device having n separate memory locations corresponding to said n pulse signals, respectively, means for storing n phase error correction signals in said n memory locations in synchronism with the tachometer pulse signals by means of an open-loop method of comparing the phase of the tachometer pulse signals with a reference signal and with the tachometer driven at a constant speed independent of the tachometer indicia thereby the derive said n phase error correction signals in the memory device, and means for reading out said n phase error correction signals stored in the memory device in synchronism with said tachometer pulse signals so as to derive n correction signals per revolution of the rotatable element.

9. An error compensation system as claimed in claim 8 further comprising, a source of said reference signal, phase comparison means having first and second inputs for receiving the reference signal and the pulse signals, respectively, and an output for supplying phase error signals to the memory device.

10. An error compensation system as claimed in claim 9 further comprising means coupled to the tachometer and to the memory device for synchronizing the storage and read-out of data of the memory device to the tachometer pulse signals.

11. An error compensation system for an apparatus that controls a rotatable element comprising, a tachometer adapted to be coupled to the rotatable element and including a plurality of indicia arranged in a closed track for deriving n pulse signals per revolution of the rotatable element, a memory device having n separate memory locations corresponding to said n pulse signals, respectively, means for storing n phase error correction signals in said n memory locations in synchronism with the tachometer pulse signals including means for comparing the phase of the tachometer pulse signals with a reference signal over a measuring period that encompasses a plurality of revolutions of the rotatable element and means for deriving the approximate average value over said measuring period of each of the phase error correction signals corresponding to the indicia in the tachometer track, a read system for reading out of the memory device said n phase error correction signals in synchronism with the tachometer pulse signals, a control device for driving the rotatable element and connected in a control-loop circuit that includes the tachometer and the phase comparing means, and the control-loop circuit includes means for limiting the control-loop circuit bandwidth during the measuring period so as to limit the upper frequency of signals passed by the control-loop circuit to a frequency value related to the speed of the rotatable element.

12. An error compensation system as claimed in claim 11 wherein said error signal deriving means comprises, an adding device having a first input coupled to receive an output signal of the phase comparing means, a second input coupled to the output of the memory device and an output coupled to an input of the memory device, and means responsive to the tachometer pulse signals for synchronizing the memory device to the tachometer so that output signals of the phase comparing means and the corresponding phase error correction signals in the memory locations are added by the adding device and stored in corresponding memory locations in the memory device in successive revolutions of the rotatable element.

* * * * *